US008751061B2

(12) United States Patent
Coulmeau et al.

(10) Patent No.: US 8,751,061 B2
(45) Date of Patent: Jun. 10, 2014

(54) NAVIGATION AID SYSTEM FOR A DRONE

(75) Inventors: François Coulmeau, Seilh (FR); Nicolas Marty, Saint Sauveur (FR); Stéphane Gomez, Montberon (FR)

(73) Assignee: Thales, Neuilly sur Seine (FR)

( * ) Notice: Subject to any disclaimer, the term of this patent is extended or adjusted under 35 U.S.C. 154(b) by 543 days.

(21) Appl. No.: 13/018,111

(22) Filed: Jan. 31, 2011

(65) Prior Publication Data

US 2011/0257813 A1 Oct. 20, 2011

(30) Foreign Application Priority Data

Feb. 2, 2010 (FR) ..................................... 10 00402

(51) Int. Cl.
*G05D 1/00* (2006.01)

(52) U.S. Cl.
USPC ............................................................ 701/2

(58) Field of Classification Search
USPC ............................................................ 701/2
See application file for complete search history.

(56) References Cited

U.S. PATENT DOCUMENTS

| | | | | |
|---|---|---|---|---|
| 6,278,396 | B1 * | 8/2001 | Tran | 342/29 |
| 7,099,752 | B1 * | 8/2006 | Lenell et al. | 701/2 |
| 7,343,232 | B2 * | 3/2008 | Duggan et al. | 701/24 |
| 7,693,624 | B2 * | 4/2010 | Duggan et al. | 701/24 |
| 8,255,098 | B2 * | 8/2012 | Jones et al. | 701/11 |
| 2003/0006910 | A1 | 1/2003 | Dame | |
| 2007/0189328 | A1 | 8/2007 | Judd | |
| 2008/0065275 | A1 | 3/2008 | Vizzini | |
| 2008/0114603 | A1 | 5/2008 | Desrochers | |

FOREIGN PATENT DOCUMENTS

| | | | |
|---|---|---|---|
| EP | 1 923 851 | A1 | 5/2008 |
| FR | 2 913 799 | A1 | 9/2008 |
| WO | 2009/139937 | A2 | 11/2009 |

* cited by examiner

*Primary Examiner* — Mary Cheung
*Assistant Examiner* — Anne Mazzara
(74) *Attorney, Agent, or Firm* — Baker & Hostetler LLP

(57) ABSTRACT

A system for aiding the navigation of an aircraft able to be piloted remotely by an operator includes means for transmitting data allowing the operator to dialogue with an air traffic controller according to at least one mode of dialogue and means for monitoring the flight parameters, notably aircraft state parameters and navigation parameters. The system also includes a means for detecting flight events, a means for formulating a message corresponding to a flight event, a means for scheduling the message in a list of messages, and a means for synthesizing the message in a mode of dialogue.

9 Claims, 1 Drawing Sheet

NAVIGATION AID SYSTEM FOR A DRONE

CROSS-REFERENCE TO RELATED APPLICATION

This application claims priority to foreign French patent application No. FR 1000402, filed on Feb. 2, 2010, the disclosure of which is incorporated by reference in its entirety.

FIELD OF THE INVENTION

The field of the invention relates to drones, and more precisely to a system for aiding the navigation of a drone in unsegregated airspace.

BACKGROUND

In current conflicts, drones are increasingly being used for recognizing and attacking non-cooperative targets. Moreover, there exist numerous applications for systems of Drones in the civil sphere (fertilizer spreading in agriculture, monitoring of forest fires, Search & Rescue, event surveillance, monitoring of demonstrations). Thus, the targets sought are often located in or in proximity to civilian spaces. Moreover, it is often compulsory for the drones to pass through airspaces subject to civil air traffic control, when their takeoff/landing base is situated inside the borders of the states which dispatch them. The insertion of drones into these regulated traffic spaces is problematic since these craft do not possess the complete insertion capabilities. Furthermore, the avionics systems carrying out the flight management functions are massively located on the ground, the aircraft carrying on board only the strict minimum for short-term navigation. Consequently, these craft are bound by draconian procedures: several days' notice, escort aircraft, closure of civilian traffic during a time slot.

Currently, when the mission is not exclusively conducted in a segregated space, that is to say prohibited to civil operations, and when the communications are required between the operator of the drone and the air traffic control services, two solutions are applied. According to a first solution, the drone is used as communication relay between the operator and the controller. The operator communicates voice messages to the drone by means of analogue or digital transmission (VHF or VoIP, Voice over IP); the drone comprises a means for converting the digital voice messages into analogue voice messages so as to transmit by means of an analogue transmission of VHF ("very high frequency"), HF ("High Frequency") type. The transmission chain in the direction from the controller to the operator is conversely identical. However, this technical solution requires the operator to have all the phraseology for communicating with the controller and consequently this task monopolizes a significant part of his attention in managing the drone. Moreover, the bandwidth necessary for digital transmission between the operator and the drone is greatly utilized for message transmission in voice format. Finally, a significant temporal latency may be introduced if the ground station of the Drone where the operator is situated is several hundred or indeed thousands of kilometers from the aircraft. According to a second solution, the operator telephones the controller directly. However, this solution involves the controller managing each drone individually and specifically. Moreover, the operator must also be responsible for all the phraseology, thus implying the same drawback aforementioned in the first solution. Having regard to the absence of any onboard pilot, it is indispensable to equip drones with more sophisticated functions assisting the ground operator in his remote management of the aircraft.

It is known to use in conventional aircraft (with onboard pilot) devices for communications by digital transmission (CPDLC for "Controller Pilot Data Link Communications") between the pilot and the air traffic controller using standardized text messages using the vocal phraseology customarily used by an air traffic controller. These CPDLC communication systems make it possible to maintain the communication over great distances with respect to radio frequency communications and especially to reduce the operational load for dialogue between the pilot and the air traffic controller. However, CPDLC dialogue mode systems are not deployed in all airspace controls and many still communicate solely by voice messaging.

SUMMARY OF THE INVENTION

The invention reduces the effort of managing drones by air traffic control (ATC) services and by the piloting operator so as to improve the safety of the aircraft and of its environment.

More precisely, the invention relates to a system for aiding the navigation of an aircraft able to be piloted remotely by an operator comprising means for transmitting data allowing the operator to dialogue with an air traffic controller according to at least one mode of dialogue and means for monitoring the flight parameters, notably aircraft state parameters and navigation parameters. The system for aiding navigation furthermore comprises a means for detecting flight events, a means for formulating a message corresponding to a flight event, a means for scheduling the message in a list of messages, a means for synthesizing the message in a mode of dialogue. A flight event is related to the state of the aircraft and/or to the navigation of the aircraft.

A first mode of dialogue is of voice type and the synthesis means for synthesizing the message is able to generate the voice phraseology corresponding to the message and a second mode of dialogue is of textual type and the means for synthesizing the message is able to generate the message according to a textual communication standard, notably of CPDLC type.

The means for transmitting data comprise a first communication means able to transmit voice messages and a second communication means able to transmit messages according to a textual communication standard notably of CPDLC type.

Advantageously, in a first variant the system for aiding navigation also comprises a means for converting voice messages into text data and a means for synthesizing the text data as a message according to the textual communication standard.

In a second variant, it also comprises a means for identifying the voice messages originating from the first communication means so as to select solely the voice messages intended for the operator.

The function for detecting a flight event is able to detect a flight event on the basis of data arising from a geo-location means, a means for monitoring the flight parameters, a trajectory management means and an information database for navigation in a flight space.

Advantageously, it comprises a means of flight command activation in response to a text message.

Advantageously, it comprises a means of flight command activation in response to a detected flight event.

A first advantage of the system for aiding navigation is the reduction in the management effort on account of the automation of navigation tasks which are repetitive or of low added value.

A second advantage is the simplification of the training of drone operators by limiting the requirements for knowledge of phraseology.

A third advantage is the maintaining of the voice messaging capability even in the case of loss of link between the ground operator and the systems of the drone.

A fourth advantage is the homogenization of the management of the drone by virtue of the means of communication in dialogue mode of voice type and of CPDLC type thus making it possible to accommodate any flight environment during the phase of transition from the voice dialogue mode to the CPDLC dialogue mode.

BRIEF DESCRIPTION OF THE DRAWINGS

The invention will be better understood and other advantages will become apparent on reading the non-limiting description which follows and by virtue of the following figures.

DETAILED DESCRIPTION

Figure 1:
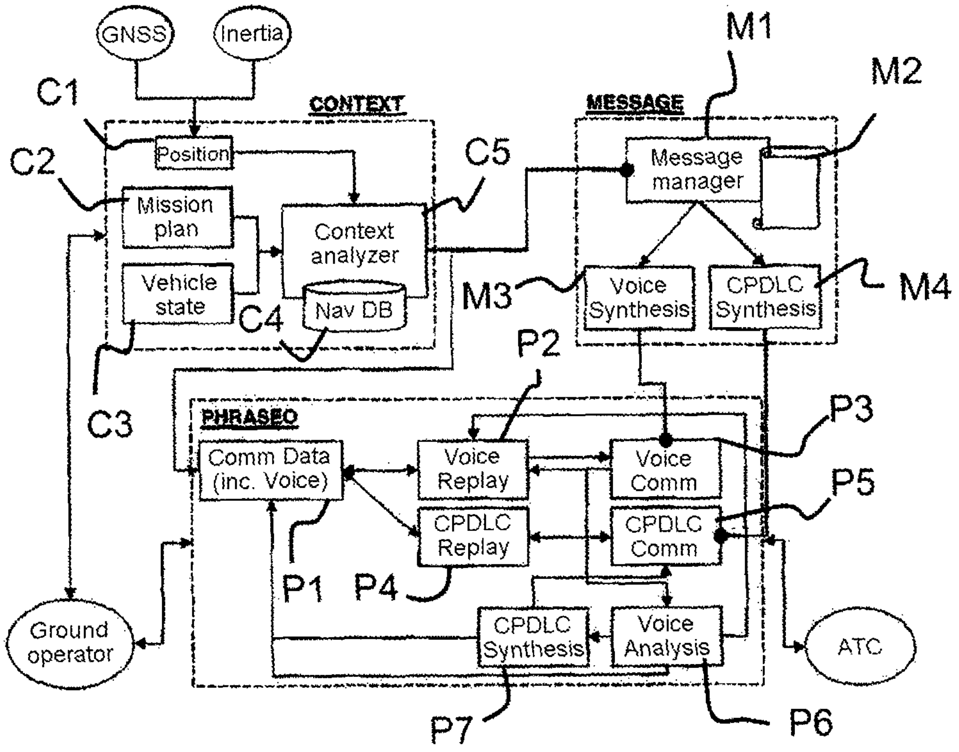
FIG. 1 represents a diagram of the functional means of the system for aiding navigation according to the most sophisticated embodiment.

The system for aiding navigation of the drone as claimed and represented by FIG. 1 comprises a first functional assembly dedicated to the transmission of the communications between the operator of the drone and the air traffic controller responsible for monitoring the zone through which the aircraft passes. This first functional assembly is named PHRASEO in the figure.

The PHRASEO communications transmission assembly comprises a first device P1 for the transmission of data of digital format between the operator of the drone and the drone. The transmission device P1 allows the operator to communicate with digital voice messages of VOIP type and also with messages of data or textual type, notably of the CPDLC communication standard.

The PHRASEO transmission assembly comprises a device for multiplexing the voice communications and CPDLC communications to a voice communication relay P2 and a CPDLC communication relay P4 respectively. The voice communication relay P2 is connected with a voice communication device P3 that can send analogue messages on the frequency used by the air traffic controller. The voice communication relay P2 implements an analogue/digital conversion function so as to convert, in a first direction, an analogue voice message received by the voice communication device P3 into a digital voice message that may be transmitted by the communication device P1 and, in the second direction, a digital voice message received by the transmission device P1 into an analogue voice message that may be sent by the voice communication device P3.

The CPDLC communication relay P4 is connected with a communication device P5 that can send CPDLC messages as well as the associated standardized communication protocols.

The CPDLC communication relay P4 implements a CPDLC conversion function (extraction of the payload of the message of the ground operator according to the "private" communication protocol used between the ground operator and his Drone, encapsulation of this payload in the CPDLC protocol format and CPDLC link management between the Drone and the controller by the standardized connection protocols). Protocols standardized at the worldwide level for civil aviation are public, and available from the ICAO (International Civil Aviation Organization).

The previously enumerated functional means P1 to P5 afford the transmission assembly capabilities for transmitting the communications, of voice or CPDLC type and of analogue or digital format for voice communications, between the operator and the controller. These functional means may be arranged according to several splitting options. According to a first splitting option, the functional means P1 to P5 are on board the aircraft. According to a second splitting option, the functional means P2 and P3 are disposed at the operator's ground station. The various options for splitting the functional means P1 to P5 do not limit the scope of the claimed invention. The devices and computers able to carry out the previously enumerated functions are known to the person skilled in the art.

The system for aiding navigation of the drone comprises a second functional assembly dedicated to the analysis of the context of the mission and of the mission plan so as to automatically generate navigation messages destined for the operator and the air traffic controller as a function of navigation data and data regarding the current state of the drone. This functional assembly addresses particularly the management of instructions having to be executed at a non-immediate moment in the flight plan when a flight condition is fulfilled (for example during the approach to a zone under the control of another aerial authority). This second functional assembly is named CONTEXT in the figure.

The CONTEXT functional assembly comprises means for detecting flight events related to the state of the aircraft and to the navigation of the aircraft. For this purpose, the CONTEXT functional assembly comprises a first means C1 for providing geo-location data of the aircraft. These geo-location data may be obtained for example on the basis of satellite positioning systems and of systems of inertial platform type or any other system making it possible to obtain location data of the aircraft. The CONTEXT assembly comprises a second means C2 for providing data relating to the mission plan of the aircraft, such as the route to be followed and the associated flight plan as well as all data related to the flight trajectory. The CONTEXT assembly comprises a third means C3 for providing data relating to the current state of the vehicle such as for example the data regarding anomalies, autonomy of current configuration of the systems (active communication frequency, etc.) or more generally the data regarding the lives of the drone's flight systems. The CONTEXT assembly comprises a fourth means C4 for providing data relating to navigation in a flight space such as for example movement procedures, communication procedures, delimitations of the flight spaces.

The data arising from the means C1 to C4 are transmitted to a computer C5 able to detect flight events on the basis of the set of data provided by C1 to C4. The computer implements an algorithm for detecting flight events which takes as input parameter the data related to the navigation of the aircraft (aircraft trajectory parameter and the navigation data for an airspace) and the current state of the vehicle are compared with the geo-location and trajectory data. These flight events are used to transmit messages representative of these events destined for the operator of the aircraft, for example the messages arising from C5 are messages of events that have been detected onboard (faults, levels of the fuel gauges, etc.) allowing it to obtain indications about the current state of the aircraft. These messages representative of events destined for the operator of the drone serve to facilitate decision-making for the pilot of the aircraft and the planning of the actions to be conducted in order to interact with the other parties of the airspace. These event messages can also serve for the creation of a list of tasks which is presented to the operator on his piloting console. With this aim, the events data are transmitted to the device P1 for transmitting data of digital format between the operator of the drone and the drone. By way of indicative example, these events messages may be an indication of transit through the environs of an aerodrome, leaving or entering a control zone and the change of frequency associated with the control zone, entering a prohibited zone.

Figure 2:
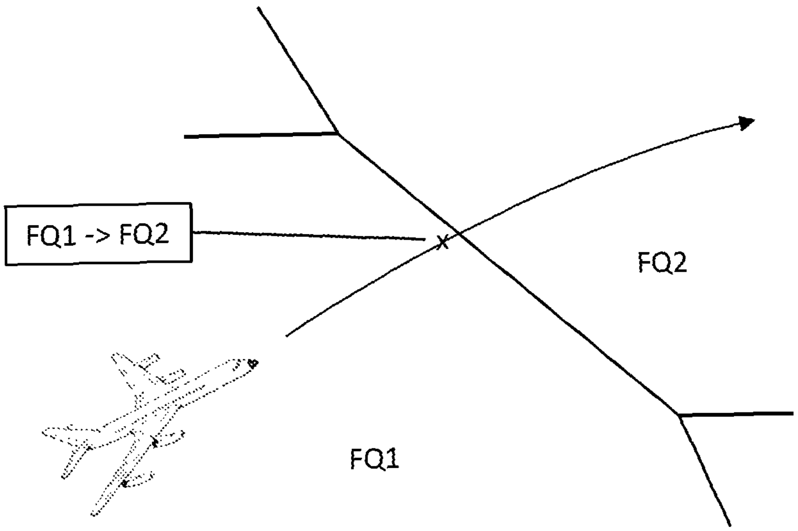
FIG. 2 represents an exemplary service for aiding navigation that may be carried out by the system for aiding navigation.

FIG. 2 illustrates the case where the flight plan of an aircraft makes provision to pass through two airspaces controlled by distinct authorities and each communicating by means of a different communication frequency. The controller of the first airspace communicates by voice on a frequency FQ1 while the controller of the second airspace communicates by voice on a frequency FQ2. When the aircraft nears the border of the two zones, an information message indicating the change of frequency is then dispatched to the operator and introduced into a task list to be carried out. Moreover, if for example the air traffic controller of the first airspace communicates in CPDLC dialogue mode and the air traffic controller of the second airspace communicates in voice dialogue mode, then a message requesting a change of dialogue mode is dispatched to the operator.

The functional means of the CONTEXT assembly may be arranged according to several splitting options. According to a first splitting option, the functional means C1 to C5 are on board the aircraft. According to additional splitting options, all or part of the functional means C2 to C5 are disposed at the operator's ground station. The various options for splitting the functional means C1 to C5 and the development of the associated architecture to be implemented are within the scope of the person skilled in the art and consequently do not limit the scope of the claimed invention.

The system for aiding navigation of the drone comprises a third functional assembly dedicated to the formulation and management of messages intended for the air traffic controller. This third functional assembly is named MESSAGE in the figure.

The MESSAGE functional assembly comprises a first means M1 for formulating a message corresponding to a flight event transmitted by the computer C5. The CONTEXT assembly transmits the detected flight events to the MESSAGE assembly. As a function of these flight events, which may possibly be associated with an ATC request received previously, the means M1 generates the content of a message to be transmitted to the air traffic controller. The formulated message contents are inserted into a message list and a priority order is ascribed to each message. The MESSAGE assembly comprises a second means M2 for the scheduling of the message contents in the list of messages. The MESSAGE assembly comprises at least one third means M3 for synthesizing the content of the message in a first dialogue mode and preferably comprises a fourth means M4 for synthesizing the content of the message in a second dialogue mode.

The means M3 is a function implemented by a computer that is able to generate a voice message on the basis of the content of a message formulated by the means M1. The function formulates the voice phraseology intended for an air traffic controller. The voice message is transmitted to the voice communication device P3, of the PHRASEO transmission assembly, which is able to send analogue voice messages on the frequency used by the air traffic controller.

The means M4 is a function implemented by a computer that is able to generate a CPDLC message on the basis of the content of a message formulated by the means M1. The function formulates the CPDLC text message intended for an air traffic controller. The CPDLC message is transmitted to the communication device P5, of the PHRASEO transmission assembly, which is able to send CPDLC messages. The messages arising from M3 and M4 are messages intended for the ATC and therefore correspond either to ATC requests (change of level for example), or to standardized auto-information, that is to say communication messages that are compulsory for the ATC.

When several messages are pending in the message list, as a function of the issuer and of the degree of priority, some messages may be dispatched by voice messaging through the functional means M1-M2-M3-P3 and other messages may be dispatched by CPDLC messaging through the functional means M1-M2-M4-P5. Indeed, some air traffic controllers may not be equipped with CPDLC communication systems while others are. Thus, the system for aiding navigation of the drone makes it possible to take into account the various possible modes of dialogue of the airspaces crossed.

In a more sophisticated variant, the PHRASEO transmission assembly comprises a means P6 for converting voice messages into text data and a means P7 for synthesizing the text data as a message according to the CPDLC textual communication standard. The conversion means P6 is in data linkup on the one hand with the voice communication relay P2 and on the other hand with the means P7 for synthesizing the text data. The means for synthesizing the text data is also linked up with the communication device P1. The conversion means P6 can also be in direct linkup with the communication device P1 so as to transmit the raw text data arising from the conversion directly to the operator's console. In this way, the message transmitted to the operator is not in the CPDLC communication format.

The conversion means P6 implements a first function for filtering the voice data originating from the voice communication relay P2. This filtering function analyses the set of voice messages sent by the air traffic controller so as to detect the identifier of the aircraft which is the recipient of the message so as to transmit solely the messages intended for the drone. This filtering function makes it possible not to overload the ground operator with messages which are not intended for him. Moreover, this filtering makes it possible to reduce the data bandwidth used for communication between the drone and the ground operator. The conversion means P6 implements a second function for voice recognition of the voice messages originating from the transmission relay P2. Thus, the voice messages sent by the operator and by the ATC controller may be converted into text data. The transmission of messages in text format rather than in voice format presents the advantage of reducing the amount of data to be transmitted and thus allows a reduction in the necessary bandwidth. The voice-text conversion function may be implemented by a computer supporting voice recognition software.

The CPDLC synthesis means P7 implements a first function for synthesizing the CPDLC messages corresponding to the text data arising from the conversion P6. Thus the operator receives the data originating from the ATC controller, when he communicates by voice messaging, in messages of CPDLC format. This presents the advantage that the operator has to manage only one CPDLC messaging interface whatever mode of dialogue is used by the ATC controller or controllers. Whether the latter communicates by voice messaging or CPDLC messaging, the operator receives the messages in CPDLC format. The CPDLC synthesis means P7 implements a second CPDLC message synthesis function corresponding to an air traffic controller request. Thus, the drone is capable of analysing an ATC request, of collating it and of transmitting to the operator of the drone the response CPDLC command corresponding to the air traffic controller's request. In this way, the risk of poor control resulting from a poor understanding of the ATC request is reduced to zero. Moreover this makes the voice control of the drone secure in so far as the air traffic controller sees what has been understood by the operator of the drone.

This more sophisticated variant of the system for aiding navigation comprising the conversion means P6 and the CPDLC synthesis means P7 makes it possible to ensure autonomy of flight of the drone when the communication link with the flight operator is lost.

Should the link between the operator and the drone be lost, in the PHRASEO functional assembly, a connection between the functional synthesis means P7 and the CPDL communication device P5 is established so that the controller's voice commands or CPDLC commands are collated by the Drone, that is to say an analysis of the command is carried out by the synthesis means P7 and a response to the ATC is transmitted in CPDLC or voice form. Thus, if a CPDLC command is received from the air traffic controller, it is possible to make the standardized CPDLC reception response, such as for example "OK I am executing the instruction XXXX" and execute the command in the navigation system of the Drone. If a Voice command is received from control, the system for aiding navigation can transform the voice command into a CPDLC command (via the voice recognition function hosted in P6), analyse and execute the CPDLC command, determine the standardized CPDLC response corresponding to the CPDLC command, and inform the air traffic controller thereof by voice (by transforming the standardized CPDLC reception response into analogue voice via the means P1, P2 and P3). By way of example, there are commands with immediate effect ("climb to level xxx", "set course yyy", "perform a direct to point zzz"). Indeed, the commands with immediate effect may be processed directly between the functional means P7 and the communication device P5.

As regards the commands with non-immediate effect which are dependent on the realization of a particular flight event, such as for example "at time HHHH, climb to level xxx", "at altitude AAAA, set course yyy", "On arrival in airspace EEE, perform a direct to point zzz", a connection between the synthesis means P7 and the flight event detection means C1, in the most sophisticated variant, makes it possible to carry out commands related to the current aircraft context. Thus, if the drone receives a CPDLC command from control, the system for aiding navigation can make the standardized CPDLC reception response (i.e. "OK, instruction XXXX clearly received"). It thereafter monitors the "triggering condition" part of the command (arrival at altitude AAAA, at time HHHH, in space EEE), and executes the "action" part of the command in the navigation system of the drone when the condition for triggering the action is detected by the flight event detection device C1. At this moment, the drone determines the standardized CPDLC response corresponding to the CPDLC command, and dispatches this response. If the command is received by the "Voice" channel from control, the system for aiding navigation can transform the voice command into a CPDLC command, analyse and execute the command when the condition for triggering the action is detected, and inform the air traffic controller thereof by voice (by transforming the standardized CPDLC reception response into analogue voice via the means P1, P2 and P3).

Having responded, automatically or otherwise, through the collation command in regard to a given ATC message, the flight instruction related to the message may be inserted into the flight plan automatically without the operator needing to modify the flight plan by himself. In this way, the system for aiding navigation presents the advantage of relieving the flight operator of a piloting task, of ensuring that the instruction inserted into the flight plan does indeed correspond to the instruction requested by the ATC and of ensuring the autonomy of flight of the aircraft should the link with the operator be lost.

The functional means P6 and P7 may be arranged according to several splitting options. According to a first splitting option, the functional means P6 and P7 are on board the aircraft. According to a second splitting option where all the voice communication means P2 and P3 are on the ground, the functional means P6 and P7 are also disposed at the level of the operator's ground station. The various options for splitting the functional means P1 to P7 do not limit the scope of the claimed invention. The devices and computers able to carry out the previously enumerated functions are known to the person skilled in the art.

The system for aiding navigation is intended particularly for ground or onboard systems for aerial vehicles with no onboard pilot of drone type.

The invention claimed is:

1. A system for aiding the navigation of an aircraft able to be piloted remotely by an operator comprising means for transmitting data allowing the operator to dialogue with an air traffic controller according to at least one mode of dialogue and, the system monitoring flight parameters including aircraft state parameters and navigation parameters, comprising:

means for detecting flight events, means for formulating a message corresponding to a flight event, means for scheduling the message in a list of messages, means for synthesizing the message in a mode of dialogue, the transmitting means being able to send the message in the mode of dialogue to the operator and/or the controller, wherein a first mode of dialogue is a voice type and the means for synthesizing the message generates voice phraseology corresponding to the message, and wherein a second mode of dialogue is a textual type and the means for synthesizing the message generates the message according to a textual communication standard comprising a Controller Pilot Data Link Communications (CPDLC) message, and a means for scheduling the CPDLC message in a list of CPDLC messages by monitoring a triggering condition of the CPDLC message and executing an action of the CPDLC message when the triggering condition is detected by the means for detecting flight events.

2. The system according to claim 1, the means for transmitting data comprising a first communication means able to transmit voice messages and a second communication means able to transmit messages according to a textual communication standard notably of CPDLC type, and further comprising a means for converting voice messages into text data and a means for synthesizing the text data as a message according to the textual communication standard.

3. The system according to claim 2, further comprising a means for identifying the voice messages originating from the first communication means so as to select solely the voice messages intended for the operator.

4. The system according to claim 1, wherein the function for detecting a flight event is able to detect a flight event on the basis of data arising from a geo-location means, a trajectory management means, and an information database for navigation in a flight space.

5. The system according to claim 1, further comprising a means of flight command activation in response to a text message.

6. The system according to claim 1, further comprising a means of flight command activation in response to a detected flight event.

7. The system according to claim 1, wherein a flight event is related to the state of the aircraft.

8. The system according to claim 1, wherein a flight event is related to the navigation of the aircraft.

9. A system for aiding the navigation of an aircraft able to be piloted remotely by an operator configured to allow an operator to dialogue with an air traffic controller according to at least one mode of dialogue and monitor flight parameters including aircraft state parameters and navigation parameters, comprising:

a functional assembly configured to detect flight events, a message functional assembly configured to formulate a message corresponding to a flight event, the message functional assembly further configured to schedule the message in a list of messages, the message functional assembly further configured to synthesize the message in a mode of dialogue, a communications transmission assembly being configured to send the message in the mode of dialogue to the operator and/or the controller, wherein a first mode of dialogue is a voice type and the message functional assembly configured to generate voice phraseology corresponding to the message, and wherein a second mode of dialogue is a textual type and the message functional assembly further configured to generate the message according to a textual communication standard comprising a Controller Pilot Data Link Communications (CPDLC) message, and the message functional assembly further configured to schedule the CPDLC message in a list of CPDLC messages by monitoring a triggering condition of the CPDLC message and executing an action of the CPDLC message when the triggering condition is detected by the message functional assembly.

* * * * *